(12) United States Patent
Kwon (10) Patent No.: US 7,512,761 B2
(45) Date of Patent: Mar. 31, 2009

(54) PROGRAMMABLE PROCESSOR AND METHODS THEREOF HAVING MEMORY ACCESS LOCKING

(75) Inventor: Kang-Duek Kwon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 328 days.

(21) Appl. No.: 11/586,613

(22) Filed: Oct. 26, 2006

(65) Prior Publication Data

US 2007/0101081 A1 May 3, 2007

(30) Foreign Application Priority Data

Oct. 28, 2005 (KR) .................... 10-2005-0102505

(51) Int. Cl.
*G06F 12/14* (2006.01)
(52) U.S. Cl. ........................... 711/163; 365/195
(58) Field of Classification Search ................ 711/163, 711/164; 365/195
See application file for complete search history.

(56) References Cited

U.S. PATENT DOCUMENTS

| | | | |
|---|---|---|---|
| 4,962,449 A | | 10/1990 | Schlesinger |
| 5,668,973 A * | | 9/1997 | Stutz et al. .................. 711/152 |
| 6,292,012 B1 | | 9/2001 | Yeh et al. |
| 6,775,750 B2 * | | 8/2004 | Krueger ....................... 711/152 |
| 6,779,099 B2 | | 8/2004 | Hou |
| 7,421,534 B2 * | | 9/2008 | Kurosawa ................... 711/103 |
| 2008/0189557 A1 * | | 8/2008 | Pipitone et al. ............. 713/193 |

FOREIGN PATENT DOCUMENTS

| | | |
|---|---|---|
| JP | 2003-256278 | 9/2003 |
| KR | 10-1998-0071673 | 10/1998 |
| WO | WO 03/090086 A1 | 10/2003 |

* cited by examiner

*Primary Examiner*—Jack A Lane
(74) *Attorney, Agent, or Firm*—Harness, Dickey & Pierce, P.L.C.

(57) ABSTRACT

A programmable processor and methods thereof are provided. The example programmable processor may include a memory lock signal generator outputting a memory lock signal, the memory lock signal indicating whether a requesting entity has authority to access requested data stored in a memory and a memory access controller receiving a request for the requested data and the memory lock signal, the memory access controller outputting a response to the requesting entity in response to the request based on the memory lock signal. A first example method may include receiving a request, from a requesting entity, to access requested data stored in a memory, determining information associated with the requesting entity and selectively outputting a response to the received request based on a security level of a location of the requested data within the memory and the determined information. A second example method may include receiving a memory lock signal indicating whether a requesting entity has authority to access requested data stored in a memory, receiving a request for the requested data from the requesting entity and selectively outputting one of the requested data and a default value other than the requested data to the requesting entity based on the memory lock signal.

33 Claims, 7 Drawing Sheets

PROGRAMMABLE PROCESSOR AND METHODS THEREOF HAVING MEMORY ACCESS LOCKING

PRIORITY STATEMENT

This application claims the benefit of Korean Patent Application No. 10-2005-0102505, filed on Oct. 28, 2005, in the Korean Intellectual Property Office, the disclosure of which is incorporated herein in its entirety by reference.

BACKGROUND OF THE INVENTION

1. Field of the Invention

Example embodiments of the present invention relate generally to a programmable processor and methods thereof, and more particularly to a programmable processor and methods of transferring data within the programmable processor.

2. Description of the Related Art

A system-on-chip (SOC) may include a hardware element as well as software configured to control the hardware element. SOCs may include a development process where SOC hardware and software are developed in parallel (e.g., separately). Software updates may be used to patch software which may not run perfectly when sold to consumers (e.g., because the parallel development may not allow complete testing before entering the market). In the SOC, a Joint Test Action Group (JTAG) or device firmware upgrade (DFU) of a universal serial bus (USB) may be examples of modules which may facilitate program update processes.

If a user updates a software program in an SOC, there may be a possibility that the security of the SOC may be compromised (e.g., illegal or inappropriate software may be downloaded and/or uploaded due to hacking). Accordingly, a conventional programmable processor of the SOC may include an encoding block and a decoding block in order to reduce a likelihood of success for a security attack of the software program during an update.

Figure 1:
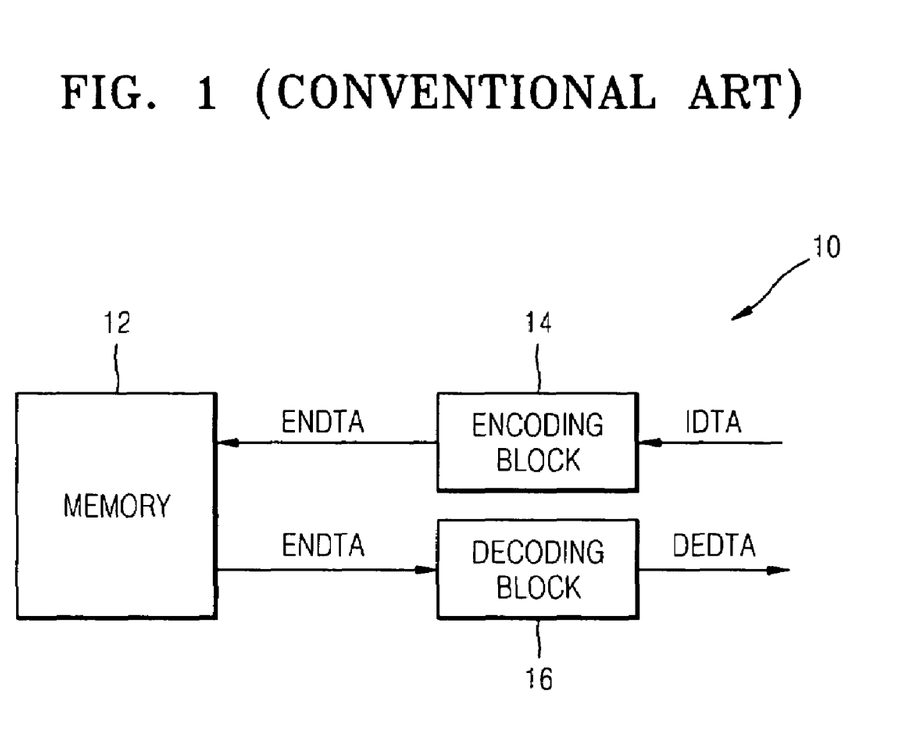
FIG. 1 is a block diagram of a conventional programmable processor.

FIG. 1 is a block diagram of a conventional programmable processor 10. Referring to FIG. 1, the conventional programmable processor 10 may include a memory 12, an encoding block 14 and a decoding block 16. The encoding block 14 may encode received data IDTA according to an encoding key and may store the encoded data ENDTA in the memory 12. The decoding block 16 may decode the encoded data ENDTA input thereto according to a decoding key and may output decoded data DEDTA.

The conventional programmable processor 10 may require several clock pulses or cycles of a clock signal to perform the above-described encoding and decoding operations. Accordingly, the decoding/encoding of data transferred to/from the memory 12 may reduce system performance. Furthermore, a layout area of a processor chip may be relatively large because the encoding block and decoding block may be included within the processor chip. Further, the encoded data may be decoded in order to allow the programmable processor to process the decoded data, thereby increasing a security risk.

SUMMARY OF THE INVENTION

An example embodiment of the present invention is directed to a programmable processor, including a memory lock signal generator outputting a memory lock signal, the memory lock signal indicating whether a requesting entity has authority to access requested data stored in a memory and a memory access controller receiving a request for the requested data and the memory lock signal, the memory access controller outputting a response to the requesting entity in response to the request based on the memory lock signal.

Another example embodiment of the present invention is directed to a method for protecting data stored in a memory of a programmable processor, including receiving a request, from a requesting entity, to access requested data stored in the memory, determining information associated with the requesting entity and selectively outputting a response to the received request based on a security level of a location of the requested data within the memory and the determined information.

Another example embodiment of the present invention is directed to a method for protecting data stored in a memory of a programmable processor, including receiving a memory lock signal indicating whether a requesting entity has authority to access requested data stored in a memory, receiving a request for the requested data from the requesting entity and selectively outputting one of the requested data and a default value other than the requested data to the requesting entity based on the memory lock signal.

Another example embodiment of the present invention is directed to a programmable processor capable of protecting data stored in a memory from hacking, having substantially stable performance, and not requiring an increase of a chip layout area.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

DETAILED DESCRIPTION OF EXAMPLE EMBODIMENTS OF THE PRESENT INVENTION

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention are susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
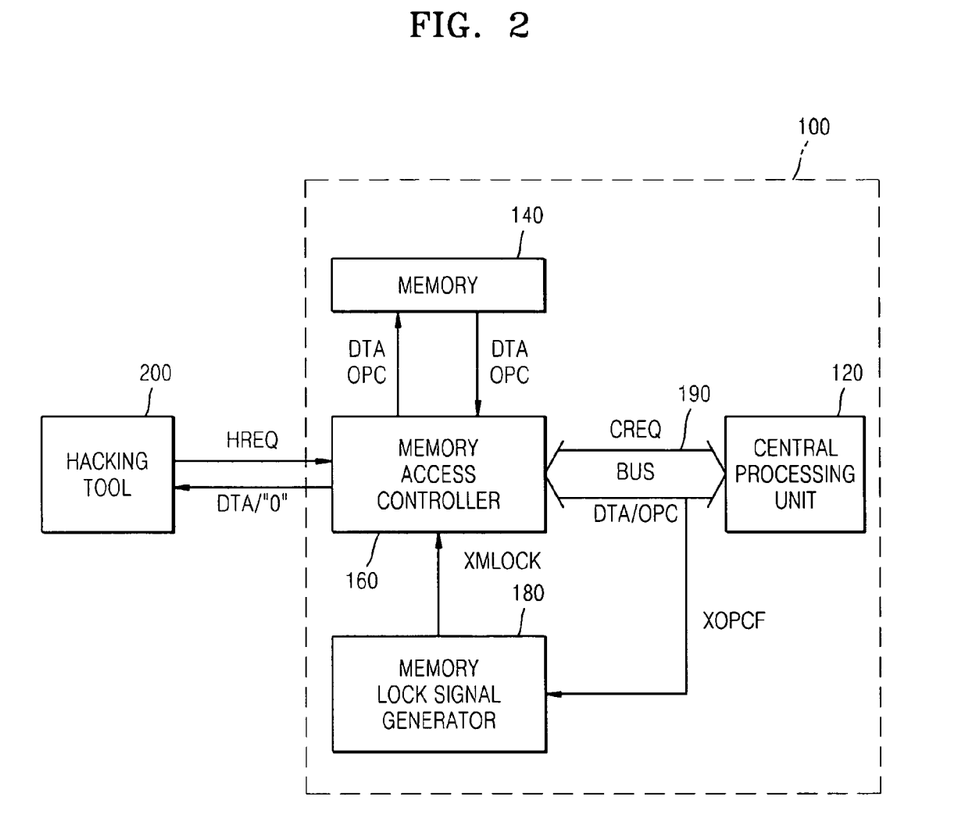
FIG. 2 is a block diagram of a programmable processor in connection with a hacking tool according to an example embodiment of the present invention.

FIG. 2 is a block diagram of a programmable processor 100 in connection with a hacking tool 200 according to an example embodiment of the present invention. In the example embodiment of FIG. 2, the programmable processor 100 may include a central processing unit 120, a memory 140, a memory access controller 160 and a memory lock signal generator 180.

In the example embodiment of FIG. 2, the memory access controller 160 may control access to the memory 140 in response to a request CREQ or HREG to read data DTA and OPC stored in the memory 140. The data stored in the memory 140 may include an operation code OPC which a user may desire to be secure from a security attack (e.g., hacking).

Figure 3:
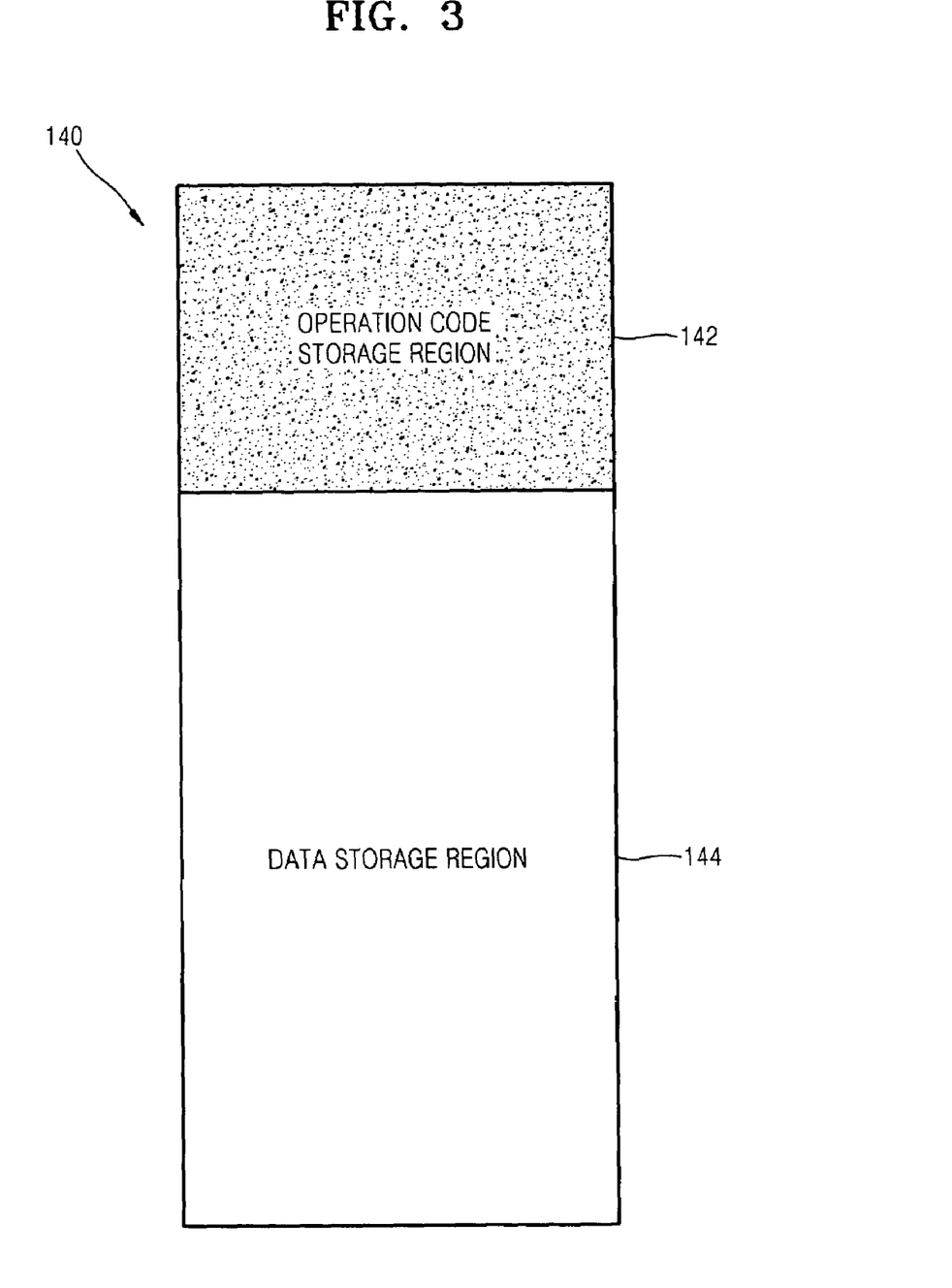
FIG. 3 illustrates a memory of the programmable processor of FIG. 2 according to another example embodiment of the present invention.

FIG. 3 illustrates the memory 140 of FIG. 2 according to another example embodiment of the present invention. In the example embodiment of FIG. 3, the memory 140 may store the operation code OPC in an operation code storage region 142 within the memory 140. As shown in FIG. 3, a data storage region 144 may be separate from the operation code storage region 142. In an example, the data storage region 144 may store less critical information, or information associated with lower security measures or requirements. In another example, the operation code storage region 142 may store all operation codes or, alternatively, a subset of all operation codes (e.g., selected by the user based on the user's security preferences). The operation code storage region 142 may be alternatively referred to as an execution only memory (EOM).

Returning to the example embodiment of FIG. 2, the memory access controller 160 may receive a normal request CREQ made by the central processing unit 120 and/or a request HREQ made by an attacker (e.g., a hacker). The memory lock signal generator 180 may determine whether the request input to the memory access controller 160 is the request CREQ made by the central processing unit 120. For example, the memory lock signal generator 180 may determine whether the request input to the memory access controller 160 corresponds to the request CREQ made by the central processing unit 120 based on an activation of an operation code fetch signal XOPCF of the central processing unit 120. The central processing unit 120 may generate the operation code fetch signal XOPCF during a request to read the operation code OPC through an internal bus 190. For example, a central processing unit of an ARM type may confirm an operation code OPC using the least significant bit during a fetch of the operation code OPC to generate the operation code fetch signal XOPCF. The memory access controller 160 may transmit the requested data to the central processing unit 120 in response to the activation operation code fetch signal XOPCF (e.g., because the activation operation code fetch signal XOPCF may authenticate the request CREQ).

In the example embodiment of FIG. 2, if the operation code fetch signal XOPCF is not activated, the memory lock signal generator 180 may output a memory lock signal XMLOCK. For example, if the request input to the memory access controller 160 corresponds to the request HREQ made by the hacking tool 200, the memory lock signal XMLOCK may be activated.

In the example embodiment of FIG. 2, the memory access controller 160 may output a default logic level as the result of the request HREQ in response to the memory lock signal XMLOCK. In an example, the default logic level may be equation to a first logic level (e.g., a higher logic level or logic "1") or a second logic level (e.g., a lower logic level or logic "0"). Thus, in an example, the memory access controller 160 may output the second logic level in response to the memory lock signal XMLOCK to block access to the memory 140.

In the example embodiment of FIG. 2, if the request corresponds to a request to read data DTA stored in a data storage region 144 of FIG. 3, the memory access controller 160 may transmit the requested data DTA. In other words, irrespective of whether the request is a request HREQ (e.g., from the hacking tool 200) or a request CREQ (e.g., an "authenticated" or authorized request from the central processing unit 120), non-secure data may be provided. Accordingly, for data that may not require protection, unrestricted access to the memory 140 may be provided. By limiting heightened security to less than all of the data within the memory 140, an efficiency of the programmable processor 100 may increase as compared to an example embodiment wherein all data is allocated "heightened" security protection.

Figure 4:
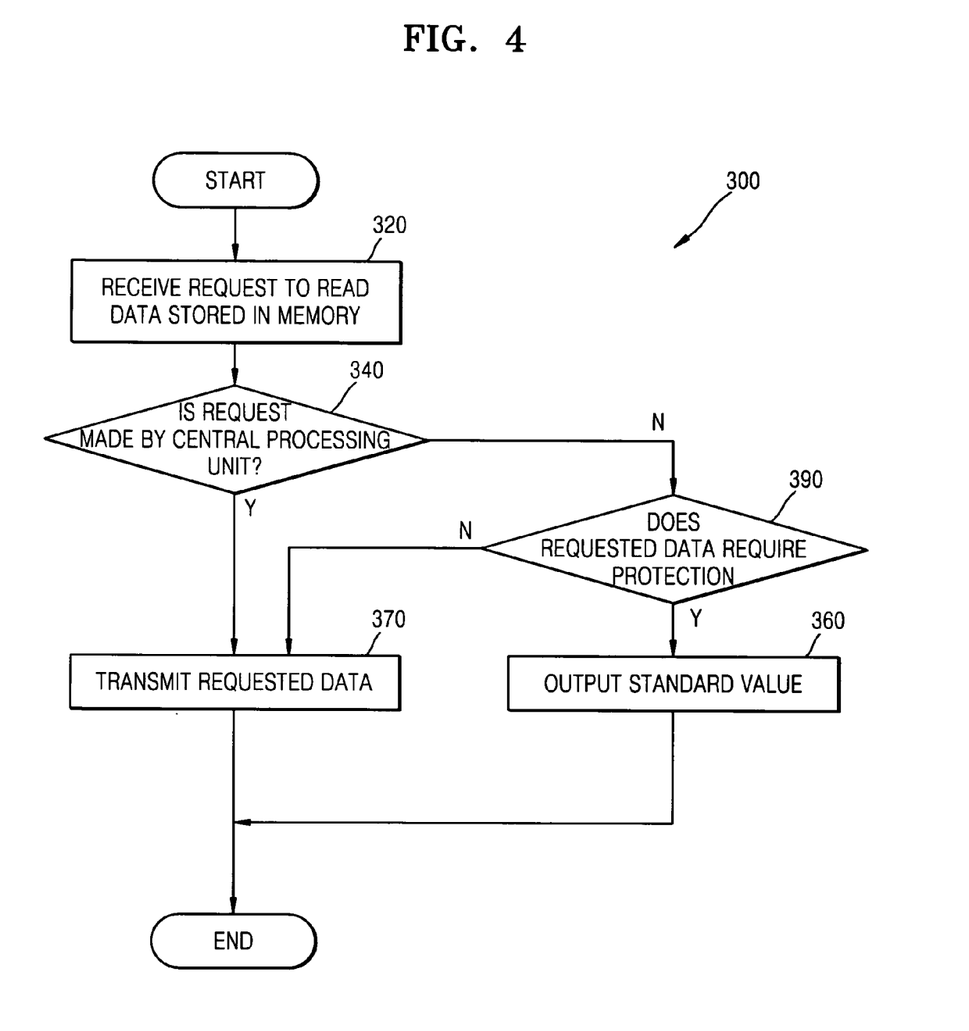
FIG. 4 is a flow chart of a process for protecting data stored in the memory of the programmable processor of FIG. 2 according to another example embodiment of the present invention.

FIG. 4 is a flow chart of a process 300 for protecting data stored in the memory 140 of the programmable processor 100 of FIG. 2 according to another example embodiment of the present invention. The example embodiment of FIG. 4 will be described below in greater detail with reference to the example embodiments of FIGS. 2 and 3.

In the example embodiment of FIG. 4, a request to read data (e.g., protected data such as OPC, unprotected data such as DTA, etc.) stored in the memory 140 may be received by the memory access controller 160 (at 320). After receiving the request to read data, the memory access controller 160 may determine whether the request originated from the central processing unit 120 (at 340). For example, the memory access controller 160 may determine an origin of the request to read data based on a status of the memory lock signal XMLOCK received from the memory lock signal generator 180 (e.g., if the memory lock signal XMLOCK is active, the request may be interpreted as coming from the central processing unit 120, etc.). If the request to send data is determined to come from the central processing unit 120, the requested data may be extracted from the memory 140 (e.g., either the operation code storage region 142 or the data storage region 144) and transferred to the requesting entity (e.g., central processing unit 120) (at 370).

In the example embodiment of FIG. 4, if the request to send data is determined not to come from the central processing unit 120, the memory access controller may determine whether the requested data, stored in the memory 140, is "secure" data (e.g., stored in the operation code storage region 142) (at 390). If the requested data is not secure data, the requested data may be extracted from the memory 140 (e.g., the data storage region 144) and transferred to the requesting entity (e.g., the hacking tool 200) (at 370). Otherwise, if the requested data is secure data and the request is determined to come from an origin other than the central processing unit 120, a default logic level (e.g., a lower logic level or logic "0") may be transferred to the requesting entity (e.g., the hacking tool 200) (at 360).

Figure 5:
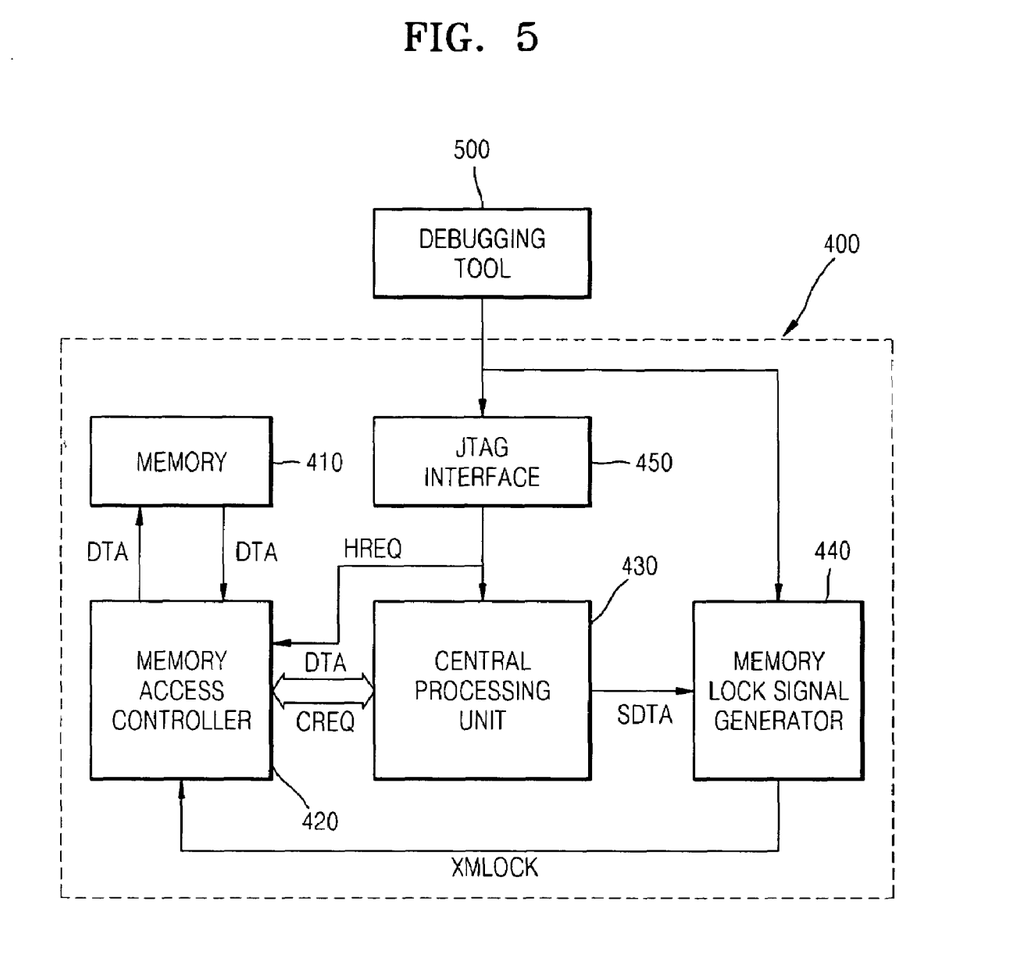
FIG. 5 is a block diagram of another programmable processor in connection with a debugging tool according to another example embodiment of the present invention.

FIG. 5 is a block diagram of another programmable processor 400 in connection with a debugging tool 500 according to another example embodiment of the present invention. In the example embodiment of FIG. 5, the programmable processor 400 may include a memory access controller 420 and a memory lock signal generator 440. The memory access controller 420 may control access to a memory 410 in response to a request (e.g., CREQ or HREQ) to read data DTA stored in the memory 410. The memory lock signal generator 440 may output a memory lock signal XMLOCK at a given logic level if the request CREQ or HREQ corresponds to a request CREQ by debugging. Here, the request CREQ may be assumed to be associated with a debugging operation and the request HREQ may be associated with a security attack (e.g., by a hacker).

Figure 6:
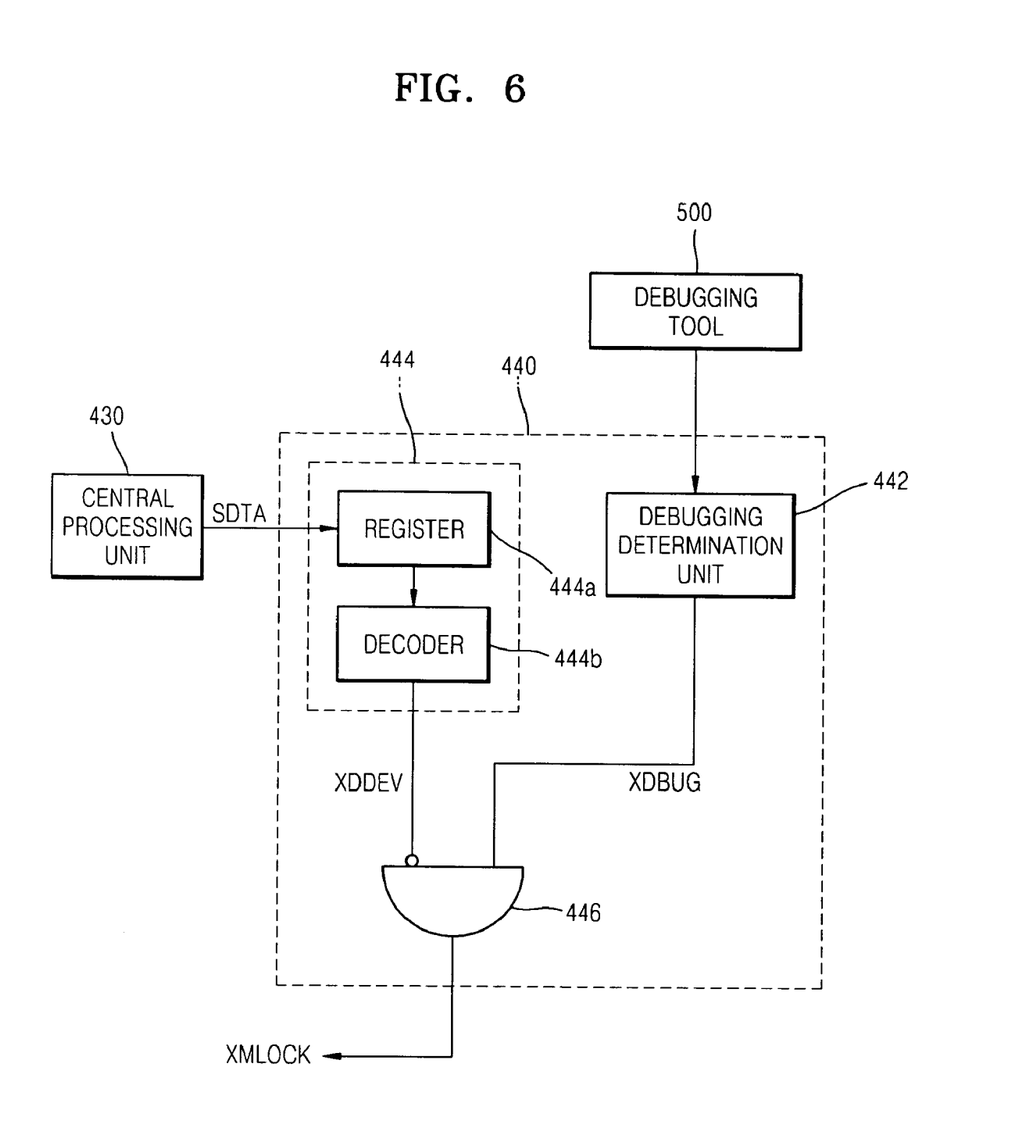
FIG. 6 is a block diagram of a memory lock signal generator of the programmable processor of FIG. 5 according to another example embodiment of the present invention.

FIG. 6 is a block diagram of the memory lock signal generator 440 of FIG. 5 according to another example embodiment of the present invention. In the example embodiments of FIGS. 5 and 6, the memory lock signal generator 440 may include a debugging determination unit 442, an execution device identification unit 444 and a logic determination unit 446.

In the example embodiment of FIG. 6, the debugging determination unit 442 may determine whether a debugging operation is being performed. For example, in the case of JTAG interfacing, the debugging determination unit 442 may recognize a debugging operation by detecting a drop from the first logic level to the second logic level of a pull-up means connected to the programmable processor 400. The debugging determination unit 442 may enable a debugging execution signal XDBUG by transitioning the debugging execution signal XDBUG to the first logic level (e.g., a higher logic level or logic "1") if a debugging operation is detected.

In the example embodiment of FIG. 6, the execution device identification unit 444 may determine whether debugging is executed or authorized by the central processing unit 430 (e.g., by a developer or manufacturer of the programmable processor 400). The execution device identification unit 444 may generate an execution device identification signal XDDEV with a logic level corresponding to a result of the determination (e.g., the first logic level if the developer is initiating the debugging operation, the second logic level if the developer is not initiating the debugging operation, etc.). For example, the execution device identification unit 444 may include a register 444a for determining whether the central processing unit 430 performs the debugging operation.

In the example embodiment of FIG. 6, the execution device identification unit 444 may determine whether standard data SDTA set by the developer is input to the register 444a. For example, the execution device identification unit 444 may recognize that a debugging operation is performed by the central processing unit 430 if the standard data SDTA is input to the register 444a.

In the example embodiment of FIG. 6, a decoder 444b included in the execution device identification unit 444 may output the execution device identification signal XDDEV at the first logic level (e.g., a higher logic level or logic "1") if the standard data SDTA is input to the register 444a and, alternatively, may output the execution device identification signal XDDEW at the second logic level (e.g., a lower logic level or logic "0") if the standard data SDTA is not input to the register 444a. For example, the decoder 444b may output the execution device identification signal XDDEV at the first logic level if "12345678", "1122334455" and "11110000" are continuously input to the register 444a as the standard data SDTA. In this example, if no data is input to the register 444a, or data other than "12345678", "1122334455" and "11110000" is input to the register 444a, the decoder 444b may output the execution device identification signal XDDEV at the second logic level. It is understood that the specific numbers provided in the above example are given for example purposes only, and other example embodiments of the present invention may be configured for operation with other data sequence triggers.

In the example embodiment of FIG. 6, the logic determination unit 446 may receive the debugging execution signal XDBUG and the execution device identification signal XDDEV and may determine the logic state of the memory lock signal XMLOCK. In an example, the logic determination unit 446 may be embodied as an AND gate 446 that receives the debugging execution signal XDBUG and the execution device identification signal XDDEV as input signals and outputs the memory lock signal XMLOCK.

In the example embodiment of FIG. 6, a debugging operation may be performed and the standard data SDTA may be input to the register 444a. Also, the debugging execution signal XDBUG may be set to the first logic level (e.g., a higher logic level or logic "1") and the execution device identification signal XDDEV may be set to the second logic level (e.g., a lower logic level or logic "0"), with each of the debugging execution signals XDBUG and the execution device identification signal XDDEV being input to the logic determination unit 446 (e.g., an AND gate). In an example, the execution device identification signal XDDEV may be inverted from the first logic level to the second logic level and input to the logic determination unit 446 (e.g., an AND gate). Thus, under the above example conditions, the logic determination unit 446 (e.g., an AND gate) may output the memory lock signal XMLOCK at the second logic level (e.g., a lower logic level or logic "0"). Alternatively, if the standard data SDTA is not input to the register 444a, the memory lock signal set to the first logic level (e.g., a higher logic level or logic "1") may be output from the logic determination unit 446.

Returning to the example embodiment of FIG. 5, the memory access controller 420 may output a default value as the result of the request HREQ in response to the memory lock signal XMLOCK. In an example, the default value may correspond to the second logic level (e.g., a lower logic level or logic "0").

In the example embodiment of FIG. 5, the memory access controller 420 may output the default value if the memory lock signal XMLOCK is received at the first logic level (e.g., a higher logic level or logic "1"). If the memory lock signal XMLOCK is inverted (e.g., the memory lock signal XMLOCK is set to the second logic level) and input to the memory access controller 420, the memory access controller 420 may transmit the requested data DTA to the central processing unit 430. Consequently, during an "authorized" debugging operation, the memory access controller 420 may read the requested data DTA in response to the memory lock signal XMLOCK set to the second logic level (e.g., a lower logic level or logic "0"). In contrast, during a security attack, the memory access controller 420 may output the default value (e.g., the second logic level such as a lower logic level or logic "0") in response to the memory lock signal XMLOCK set to the first logic level (e.g., a higher logic level or logic "1"). Thereby, unauthorized access to the memory 410 (e.g., by a hacker, an unauthorized debugging tool, etc.) may be reduced and/or prevented.

In the example embodiment of FIG. 5, the programmable processor 400 may further include a JTAG interface 450 to interface (e.g., exchange information) with the debugging tool 500.

Figure 7:
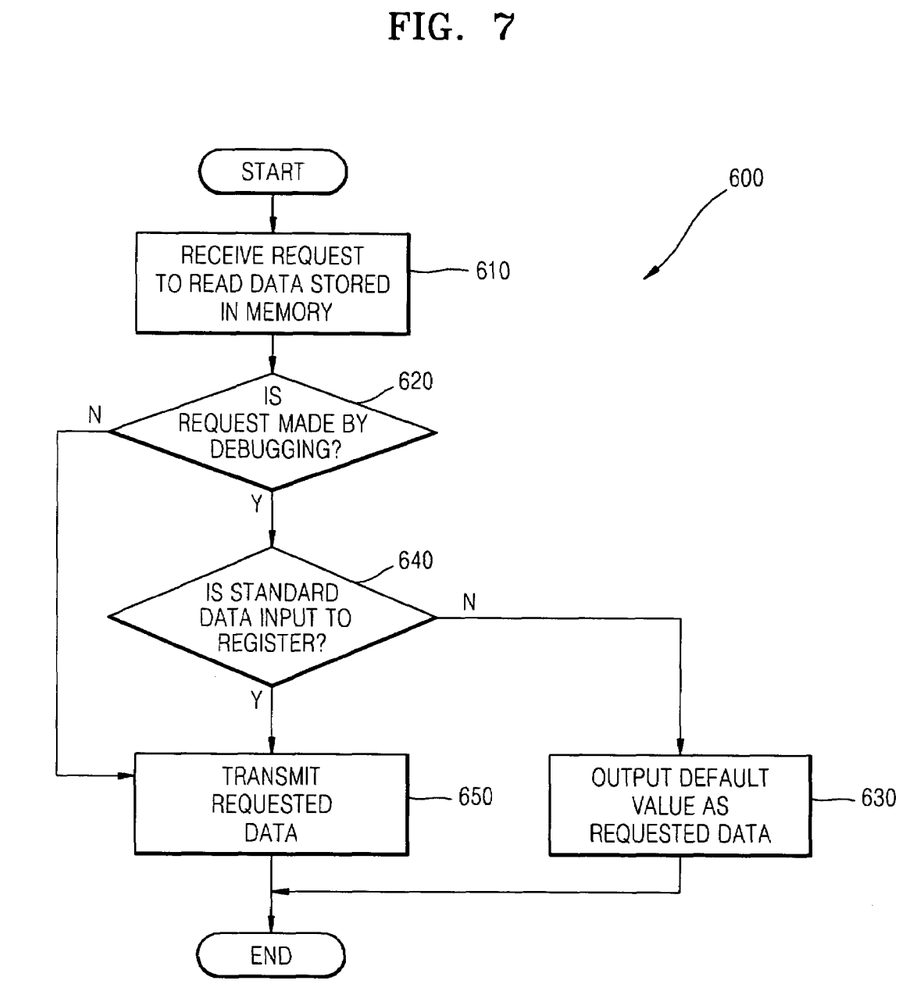
FIG. 7 is a flow chart of a process for protecting data stored in the memory of the programmable processor of FIG. 5 according to another example embodiment of the present invention.

FIG. 7 is a flow chart of a process 600 for protecting data stored in the memory 410 of the programmable processor 400 of FIG. 5 according to another example embodiment of the present invention. The example embodiment of FIG. 7 will be described below in greater detail with reference to the example embodiments of FIGS. 5 and 6.

In the example embodiment of FIG. 7, a request to read data (e.g., protected data such as OPC, unprotected data such as DTA, etc.) stored in the memory 410 may be received by the memory access controller 420 (at 610). After receiving the request to read data, the memory access controller 420 may determine whether the request is associated with a debugging operation (at 620). For example, the memory access controller 420 may determine that the request is associated with a debugging operation if the debugging execution signal XDBUG is enabled (e.g., set to the first logic level). If the request to send data is determined not to be associated with a debugging operation (e.g., the debugging execution signal XDBUG is not enabled, the request is a request CREQ from the central processing unit 430, etc.), the requested data may be extracted from the memory 410 and transferred to the requesting entity (e.g., central processing unit 430) (at 650).

In the example embodiment of FIG. 7, if the request to send data is associated with a debugging operation, the memory access controller 420 may determine whether "standard" or trigger data SDTA is being input to the register 444a (e.g., see the example above related to standard data SDTA of "12345678", "1122334455" and "11110000") (at 640). In an example, the standard data SDTA may function to authenticate the request for data. If the standard data SDTA is determined to be input to the register 444a, the requested data may be extracted from the memory 410 and transferred to the requesting entity (e.g., the central processing unit 430) (e.g., in response to XMLOCK being set to the second logic level) (at 650). Otherwise, if the standard data SDTA is determined not to be input to the register 444a, the default value (e.g., the second logic level, such as a lower logic level or logic "0") may be output to the requesting entity.

In another example embodiment of the present invention, a programmable processor (e.g., programmable processor 100, 400, etc.) may be configured to protect at least a portion of data stored in a memory while also reducing conventional delays associated with accessing data from "secure" memory locations. In example embodiments of the present invention, the programmable processor need not include functional blocks for encoding/decoding memory, thereby increasing an operating efficiency of the system as well as reducing a layout area of the programmable processor.

Example embodiments of the present invention being thus described, it will be obvious that the same may be varied in many ways. For example, it is understood that the above-described first and second logic levels may correspond to a higher level and a lower logic level, respectively, in an example embodiment of the present invention. Alternatively, the first and second logic levels/states may correspond to the lower logic level and the higher logic level, respectively, in other example embodiments of the present invention.

Such variations are not to be regarded as a departure from the spirit and scope of example embodiments of the present invention, and all such modifications as would be obvious to one skilled in the art are intended to be included within the scope of the following claims.

What is claimed is:

1. A programmable processor, comprising:
   a memory lock signal generator outputting a memory lock signal, the memory lock signal indicating whether a requesting entity has authority to access requested data stored in a memory; and
   a memory access controller receiving a request for the requested data and the memory lock signal, the memory access controller outputting a response to the requesting entity in response to the request based on the memory lock signal.

2. The programmable processor of claim 1, wherein the memory lock signal generator indicates that the requesting entity does not have authority to access the requested data if the requesting entity is not a central processing unit.

3. The programmable processor of claim 1, wherein the memory access controller outputs the response to the requesting entity as a default value if the memory lock signal indicates that the requesting entity does not have authority to access the requested data.

4. The programmable processor of claim 1, wherein the requested data is included within a location reserved for protected data.

5. The programmable processor of claim 4, wherein the protected data includes operation code.

6. The programmable processor of claim 1, wherein the memory includes a first memory portion for storing the protected data and a second memory portion for storing unprotected data.

7. The programmable processor of claim 6, wherein the memory access controller outputs the requested data as the response if the requested data is stored in the second memory portion.

8. The programmable processor of claim 1, wherein the memory lock signal generator determines whether the requesting entity is a central processing unit based on a status of an operation code fetch signal of the central processing unit.

9. The programmable processor of claim 8, wherein the memory lock signal generator generates the memory lock signal indicating that the central processing unit has authority to access the requested data.

10. The programmable process of claim 9, wherein the memory access controller transmits the requested data to the central processing unit as the response.

11. The programmable processor of claim 1, wherein the programmable processor is included within a system-on-chip (SOC).

12. The programmable processor of claim 1, wherein the memory lock signal generator outputs the memory lock signal indicating that the requesting entity has authority to access the requested data if the request is associated with a debugging operation, the debugging operation authorized by a central processing unit.

13. The programmable processor of claim 12, wherein the memory access controller outputs the response to the requesting entity as a default value if the debugging operation is not authorized by the central processing unit.

14. The programmable processor of claim 12, wherein the memory lock signal generator includes:
   a debugging determination unit outputting a debugging execution signal indicating whether a debugging operation is being performed;
   an execution device identification unit outputting an execution device identification signal indicating whether the central processing unit authorizes the debugging operation; and
   a logic determination unit determining a status of the memory lock signal based on the debugging execution signal and the execution device identification signal.

15. The programmable processor of claim 14, wherein the logic determination unit is an AND gate performing an AND operation of the debugging execution signal and the execution device identification signal to output the memory lock signal.

16. The programmable processor of claim 14, wherein the execution device identification unit includes a register to determine whether the debugging is performed by the central processing unit based on information received from the central processing unit.

17. The programmable processor of claim 12, wherein the debugging operation is carried out by a Joint Test Action Group (JTAG) device.

18. A method for protecting data stored in a memory of a programmable processor, comprising:
   receiving a request, from a requesting entity, to access requested data stored in the memory;
   determining information associated with the requesting entity; and
   selectively outputting a response to the received request based on a security level of a location of the requested data within the memory and the determined information.

19. The method of claim 18, wherein selectively outputting the response includes:
   outputting a default value if the requested data is stored in a portion of the memory reserved for protected data and the determined information indicates that the requesting entity is not authorized to receive the requested data; and
   outputting the requested data if the requested data is not stored in a portion of the memory reserved for protected data.

20. The method of claim 19, wherein the determined information indicates that the requesting entity is not authorized to receive the requested data if the requesting entity is not a central processing unit of the programmable processor.

21. The method of claim 18, wherein the default value is one of a first logic level and a second logic level.

22. The method of claim 21, wherein the first logic level is a higher logic level and the second logic level is a lower logic level.

23. The method of claim 18, wherein the memory includes a first memory portion for storing protected data and a second memory portion for storing unprotected data.

24. The method of claim 18, wherein determining information associated with the requesting entity determines whether the requesting entity is a central processing unit based on a status of an operation code fetch signal received from the central processing unit.

25. The method of claim 24, further comprising:
   transmitting the requested data to the central processing unit if the operation code fetch signal is enabled.

26. The method of claim 18, wherein determining information associated with the requesting entity includes determining whether the requesting entity is performing a debugging operation.

27. The method of claim 26, further comprising:
   determining whether standard data is input to a register; and
   outputting a default value as the response to the request for the requested data if the requesting entity is performing a debugging operation and the standard data is not input to the register; and
   outputting the requested data as the response to the request for the requested data if the standard data is input to the register.

28. The method of claim 27, wherein the requested data is output to a central processing unit.

29. The method of claim 26, wherein the requesting entity is a debugging tool.

30. The method of claim 29, wherein the debugging tool is a Joint Test Action Group (JTAG) device.

31. The method of claim 18, further comprising:
   transmitting the requested data to the requesting entity if the requested data is associated with a lower security level irrespective of the determined information.

32. A method for protecting data stored in a memory of a programmable processor, comprising:
   receiving a memory lock signal indicating whether a requesting entity has authority to access requested data stored in a memory;
   receiving a request for the requested data from the requesting entity; and
   selectively outputting one of the requested data and a default value other than the requested data to the requesting entity based on the memory lock signal.

33. A method for protecting data stored in a memory of the programmable processor of claim 1.

* * * * *